US012122156B2

(12) United States Patent
Kato et al.

(10) Patent No.: US 12,122,156 B2
(45) Date of Patent: Oct. 22, 2024

(54) LIQUID EJECTION APPARATUS AND DETERMINATION METHOD FOR DETERMINING EJECTION STATE

(71) Applicant: CANON KABUSHIKI KAISHA, Tokyo (JP)

(72) Inventors: Takashi Kato, Kanagawa (JP); Yoshiyuki Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 17/820,320

(22) Filed: Aug. 17, 2022

(65) Prior Publication Data

US 2023/0054702 A1 Feb. 23, 2023

(30) Foreign Application Priority Data

Aug. 23, 2021 (JP) ................................ 2021-135582

(51) Int. Cl.
*B41J 2/045* (2006.01)

(52) U.S. Cl.
CPC ........... *B41J 2/0458* (2013.01); *B41J 2/0451* (2013.01); *B41J 2/0454* (2013.01); *B41J 2/04563* (2013.01)

(58) Field of Classification Search
CPC ...... B41J 2/0458; B41J 2/0451; B41J 2/0454; B41J 2/04563
See application file for complete search history.

(56) References Cited

U.S. PATENT DOCUMENTS

2007/0229566 A1* 10/2007 Takabayashi ........ B41J 2/04541 347/17
2007/0291068 A1* 12/2007 Aoki ...................... B41J 2/0454 347/17
2010/0156982 A1* 6/2010 Sasagawa ............ B41J 2/14153 347/14

FOREIGN PATENT DOCUMENTS

JP 2007331354 A 12/2007

* cited by examiner

*Primary Examiner* — Jason S Uhlenhake
(74) *Attorney, Agent, or Firm* — Canon U.S.A., Inc. IP Division

(57) ABSTRACT

A method is provided for determining, in a liquid ejection apparatus, a state of a liquid ejection from an ejection port. The liquid ejection apparatus includes the ejection port configured to eject a liquid, a substrate comprising an electrothermal conversion element configured to generate heat for ejecting the liquid from the ejection port, and a temperature detection unit configured to detect temperature information on the substrate. The method includes performing a first comparison process to compare the temperature information on the substrate detected at a first timing by the temperature detection unit with a first threshold value, and performing a second comparison process to compare the temperature information on the substrate detected at a second timing by the temperature detection unit with a second threshold value.

11 Claims, 12 Drawing Sheets

LIQUID EJECTION APPARATUS AND DETERMINATION METHOD FOR DETERMINING EJECTION STATE

BACKGROUND

Field of the Invention

The present disclosure relates to a liquid ejection apparatus configured to eject a liquid and a determination method for determining an ejection state.

Description of the Related Art

An inkjet recording apparatus (a liquid ejection apparatus) records various information such as an image on a recording material such as paper by ejecting ink (liquid) from a small nozzle (an ejection port). A thermal inkjet method is known as one of recording methods for an inkjet recording apparatus. In the thermal inkjet method, ink is ejected from an ejection port by film-boiling ink with heat energy generated in a heater (an electrothermal conversion element).

In the inkjet recording apparatus, an image formation problem occurs when a failure of ejecting ink occurs. In a full-line type recording apparatus, a huge number of nozzles are arranged on a line with a length corresponding to the entire width of a recording medium, which enables high-speed printing. An occurrence of an ejection failure is likely to cause an adverse effect on an image, and thus it is necessary to perform a recovery operation of a recording head. The recovery operation has following two types: wiping a nozzle surface while sucking; and wiping the nozzle surface without sucking. Both types cause downtime to occur. When the recovery operation includes sucking, wasting of ink occurs. For the inkjet recording apparatus, it is desirable to have as little downtime and wasting of ink as possible. Therefore, it is important to quickly identify what type of ejection failure is occurring in which one of the huge number of nozzles to make it possible to perform an adequate recovery operation at an adequate timing.

The ejection failure is roughly classified into two cases: a first case where an ejection failure occurs when there is ink on the heater; and a second case where an ejection failure occurs when there is no ink on the heater. A first type of the ejection failure in the first case is an external-dust ejection failure which occurs, for example, when the ejection is hindered by a foreign material such as paper dust adhering to the nozzle surface. A second type of the ejection failure in the first case is a wet ejection failure which occurs when ink adheres to the nozzle surface due to a satellite droplet or mist which hinders ejection. A third type of the ejection failure in the first case is a thickened ink ejection failure which is an ejection failure due to thickening of ink caused by moisture evaporation from the ejection port. A fourth type of the ejection failure in the first case is an internal-dust ejection failure which occurs when a foreign material intrudes into the inside of the nozzle and the ejection is hindered by the foreign material. An example of an ejection failure in the second case is an air bubble ejection failure which occurs when an air bubble intrudes into the inside of a nozzle and the ejection is hindered by the air bubble. When an ejection failure occurs, which type of ejection failure is dominant depends on the head structure and the nozzle structure.

Conventionally, to detect such an ejection failure in a thermal inkjet recording apparatus, it is known to check a change in temperature with time which occurs when a heater is driven to eject ink. An apparatus has been proposed which uses the method of determining the type of the ejection failure.

Japanese Patent Laid-Open No. 2007-331354 discloses a method of identifying a state of an ejection failure by measuring temperature at a predetermined timing and comparing the measured temperature with a plurality of threshold values.

Although Japanese Patent Laid-Open No. 2007-331354 discloses the technique of determining the state of the ejection failure by making comparisons with a plurality of threshold values at one timing, this technique does not allow it to provide a large determination range for each state determination because it is necessary to make the comparisons with the plurality of threshold values. Therefore, there is a possibility that it is difficult to maintain high determination reliability including the robustness against variations of the ink and the nozzle. Japanese Patent Laid-Open No. 2007-331354 also describes a technique of performing determination by making a comparison with one threshold value at each of a plurality of timings. However, to identify the ejection failure state, the determination process is performed three or more times, which makes it difficult to achieve high-speed determination.

To handle the above situation, the present disclosure provides a method of determining a state of an ejection failure with a high determination reliability in a short time by making a comparison with one threshold value at each of two timings.

SUMMARY

The present disclosure provides a method of determining, in a liquid ejection apparatus, a state of a liquid ejection from an ejection port, the liquid ejection apparatus including the ejection port configured to eject a liquid, a substrate comprising an electrothermal conversion element configured to generate heat for ejecting the liquid from the ejection port, and a temperature detection unit configured to detect temperature information on the substrate, the method including performing a first comparison process to compare the temperature information on the substrate detected at a first timing by the temperature detection unit with a first threshold value, and performing a second comparison process to compare the temperature information on the substrate detected at a second timing by the temperature detection unit with a second threshold value.

Further features of the present invention will become apparent from the following description of exemplary embodiments with reference to the attached drawings.

BRIEF DESCRIPTION OF THE DRAWINGS

FIGS. 2A, 2B and 2C are each a schematic view of an inkjet recording head, wherein FIG. 2A is a top view and FIGS. 2B and 2C are each a cross-sectional view.

DESCRIPTION OF THE EMBODIMENTS

Embodiments of the present disclosure are described in detail below.

First Embodiment

Sensor

A configuration of an inkjet recording apparatus is described below to which the present disclosure is applicable.

Figure 1:
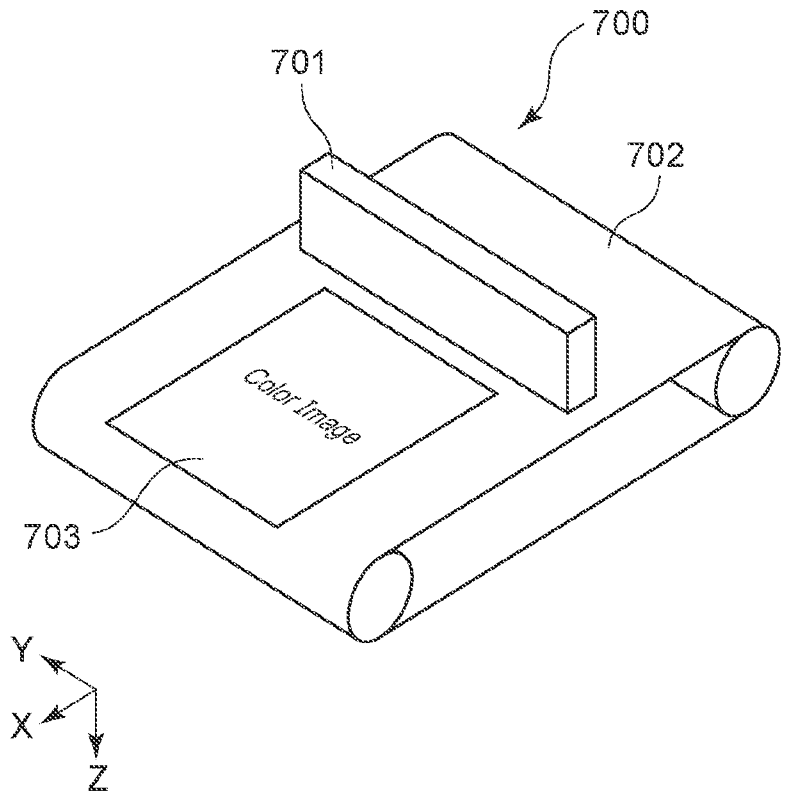
FIG. 1 is a perspective view of a full-line type inkjet recording apparatus.

FIG. 1 is a schematic diagram illustrating main parts of a full-line type inkjet recording apparatus 700. A recording head 701 includes a plurality of nozzle lines along each of which a plurality of nozzles are arranged. By ejecting ink droplets from the recording head including nozzles, an image is recorded on a recording medium 703 conveyed by a conveying unit 702.

Figure 2A:
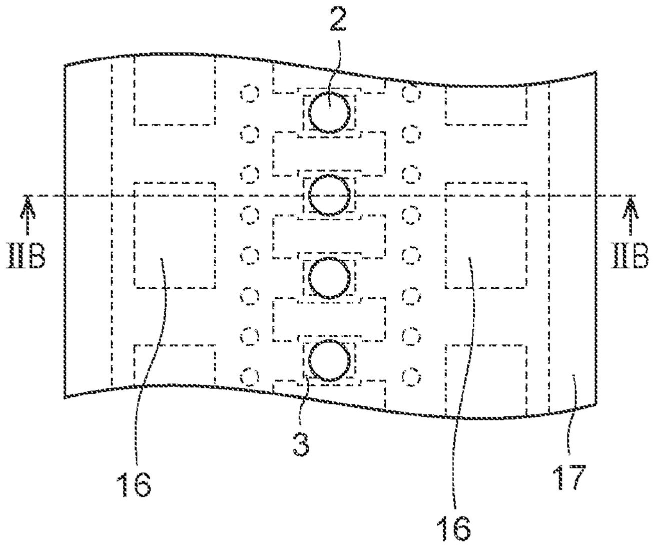
Figure 2B:
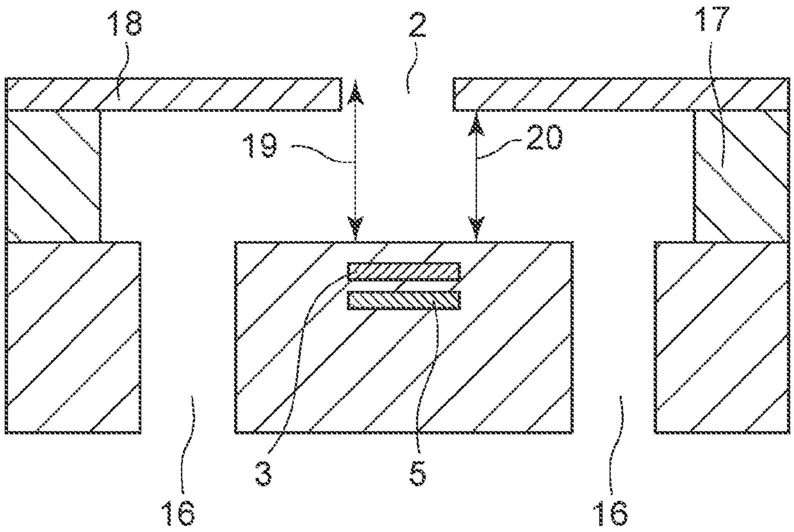
Figure 2C:
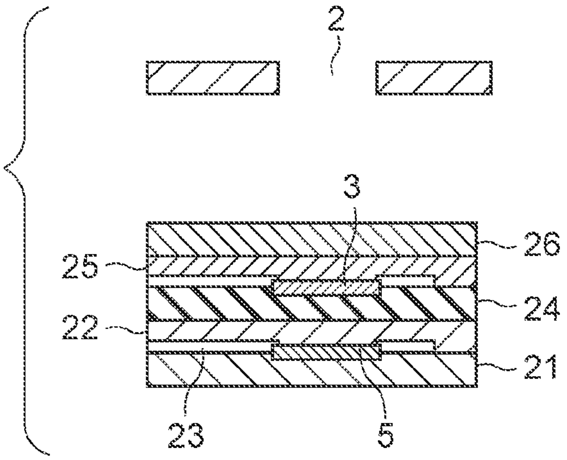

FIG. 2A is a schematic top view of an entire nozzle part provided in the recording head. FIG. 2B is a schematic cross-sectional view taken along line IIB-IIB shown in FIG. 2A. FIG. 2C is a schematic cross-sectional view showing a film structure in the vicinity of an ejection port shown in FIG. 2B.

FIG. 2A schematically illustrates, in the recording head, a top surface of an entire nozzle part where ejection ports 2 are arranged. By applying a drive signal to an electrothermal conversion element (hereinafter referred to as a heater 3) provided for each ejection port 2, ink inside the ejection port 2 is heated thereby ejecting the ink from the ejection port 2. Liquid supply ports 16 for supplying ink to the nozzle are formed on both sides of the nozzle.

FIG. 2B is a diagram schematically showing a cross section of a nozzle structure taken along line IIB-IIB shown in FIG. 2A. A temperature detection element (hereinafter, referred to as a temperature sensor 5 or a temperature detection unit) for detecting a change in temperature (temperature information) of a substrate is formed directly below each heater 3. The temperature information on the substrate is detected based on the output result from the temperature detection element. In FIG. 2B, the temperature sensor is provided directly below the heater to detect a change in temperature in the vicinity of the heater, but it may be disposed directly above the heater as long as the change in temperature in the vicinity of the heater can be detected. An ejection port formation part 18 forming the ejection port 2 is supported by a flow path formation part 17. Here, to represent a nozzle size, the nozzle height 19 and the flow path height 20 are defined as shown in FIG. 2B.

FIG. 2C is a diagram showing a multilayer structure forming the heater and the temperature sensor. Both the heater 3 and the temperature sensor 5 are formed in the multilayer structure on a substrate using the same film formation process. On the Si substrate 21, an individual wiring 23 made of Al or the like for interconnecting the temperature sensor 5, and an Al wiring connecting the heater 3 and a control circuit formed on the Si substrate 21 are formed via a heat storage layer 22 made of a thermal oxide film $SiO_2$ or the like. The temperature sensor 5 is formed of a thin film resistor whose resistance value changes depending on the temperature. Examples of materials for the thin film resistor include Al, Pt, Ti, TiN, TiSi, Ta, TaN, TaSiN, TaCr, Cr, CrSi, CrSiN, W, $WSi_2$, WN, Poly-Si, α-Si, Mo, MoSi, Nb, and Ru. Furthermore, on the Si substrate 21, via an interlayer insulating film 24, the heater 3, a passivation film 25 formed of SiN or the like, and a cavitation resistance film 26 are formed in the multilayer structure with a high density by a semiconductor process. The cavitation resistance film 26 is a film for enhancing the resistance against the cavitation on the heater 3. For example, a Ta film is used as the cavitation resistance film 26. One temperature sensor 5 is provided separately and independently for each heater 3 such that the temperature sensor 5 is disposed directly below the corresponding heaters 3. The individual wiring 23 connected to corresponding one temperature sensor 5 is formed as a part of a detection circuit that detects information related to the temperature detection element. According to the present embodiment, the structure of the recording head is formed by patterning each element using the conventional process for producing the inkjet recording head, and thus it is possible to produce the recording head without changing the structure of the recording head from the conventional structure of the recording head, which is a great advantage from the point of view of the industrial production.

Figure 3:
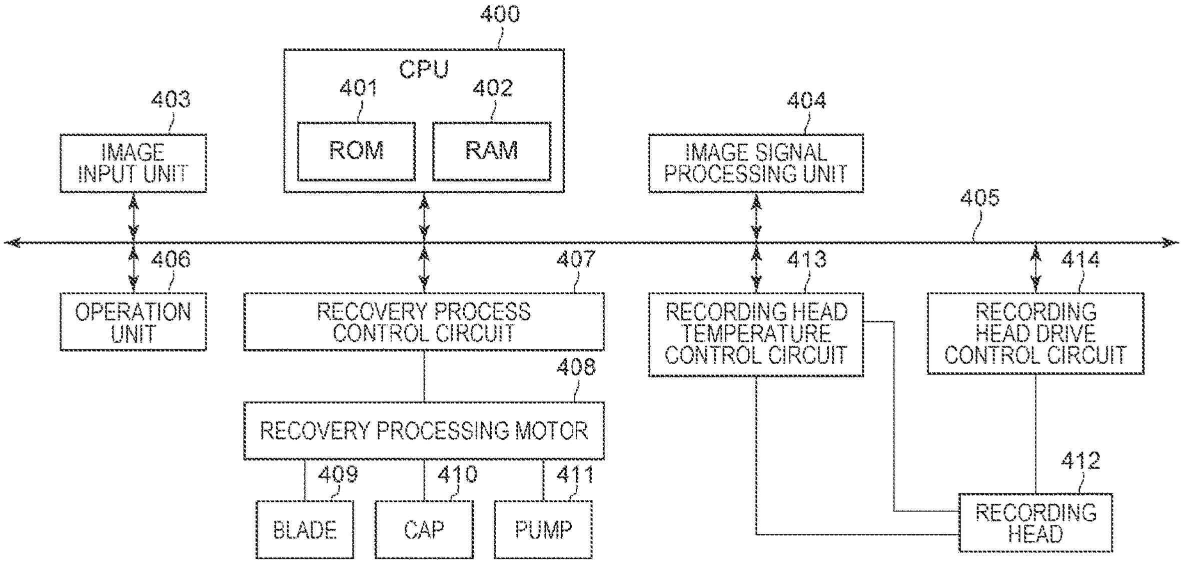
FIG. 3 is a diagram showing control function blocks of a liquid ejection apparatus.

FIG. 3 is a block diagram of a control circuit of a recording apparatus. As shown in FIG. 3, the control circuit includes an image input unit 403, an image signal processing unit 404, and a CPU 400, configured such that they are allowed to access a main bus 405.

The CPU 400 includes a ROM 401 and a RAM 402, and performs control such that a proper recording condition is given for input information and the recording head 412 is driven so as to record the input information according to the recording condition. A program for executing a recovery procedure to recover the recording head is stored in the RAM 402 in advance, and recovery conditions such as a preliminary ejection condition are given to the recovery processing control circuit 407, the recording head, etc.

A recovery processing motor 408 drives the recording head, a blade (a cleaning blade) 409 provided facing the recording head, a cap 410, and a suction pump 411.

A recording head drive control circuit 414 drives the heater 3, which is an electrothermal conversion element of the recording head 412, according to a driving condition given by the CPU 400, and causes the recording head to perform preliminary ejection and recording ink ejection.

Determination Based on Change in Temperature with Time

Figure 4:
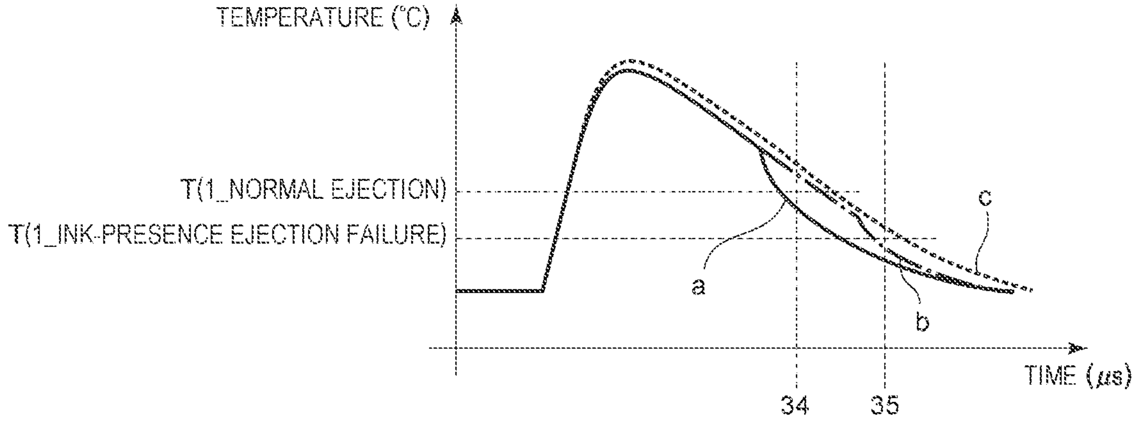
FIG. 4 is a diagram showing a change in detected temperature with time which occurs when an electrothermal conversion element is driven.
Figure 5A:
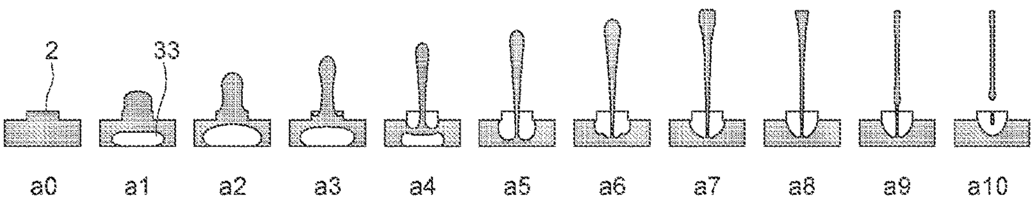
FIGS. 5A, 5B, and 5C each illustrate a change in a cross section of an ejection port with time which occurs when the electrothermal conversion element is driven.
Figure 5B:
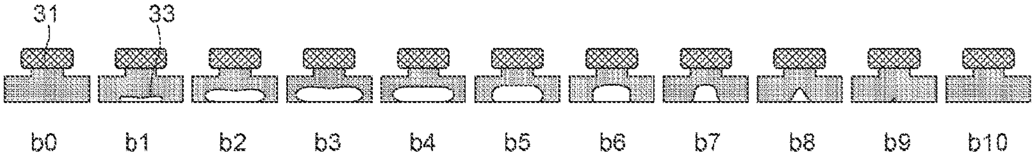
Figure 5C:
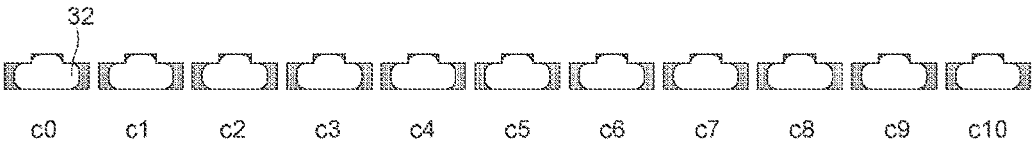

FIG. 4 is a curve diagram showing a change in temperature with time (a temperate change waveform) which occurs when a drive voltage pulse is applied to the heater to eject ink. As shown in FIG. 4, the temperature curve detected by the temperature sensor varies depending on a difference in the state of the nozzle a, b, or c. FIGS. 5A, 5B, and 5C illustrate changes in the cross section of the nozzle part with time for the respective states a, b, and c shown in FIG. 4. In FIGS. 5A, 5B, and 5C, a0 to a10, b0 to b10, and c0 to c10 indicate time from a time of an initial state 0 μs to 10 μs taken in intervals of 1 μs.

In FIG. 4, a shows a temperature change which occurs when ink is ejected normally without an ejection failure (hereinafter, this type of ejection will be referred to as a normal ejection). In FIG. 4, b shows a temperature change which occurs when an ejection failure occurs in a state in which there is ink on the electrothermal conversion element (hereinafter, this type of ejection failure will be referred to as an ink-presence ejection failure). In FIG. 4, c shows a temperature change which occurs when an ejection failure occurs in a state in which there is no ink on the electrothermal conversion element (hereinafter, this type of ejection failure will be referred to as no-ink ejection failure). As shown in FIG. 4, in the nozzle states a and b, the temperature increases in response to applying of a drive voltage pulse, and the temperature decreases after a maximum temperature is reached. In the temperature reduction process, a characteristic point occurs at which a sudden temperature reduction occurs in the detected temperature change with time. Note that the characteristic point occurs at a different time depending on whether the nozzle is in the state a or b. On the other hand, as shown in FIG. 4, in the case of the nozzle state c, the temperature decreases without the occurrence of a characteristic point.

Referring to FIGS. 5A, 5B, and 5C, reasons are described why the characteristic point occurs in the temperature change with time at different times as in the cases of a and b shown in FIG. 4, and why no characteristic point occurs in the case of c shown in FIG. 4.

In FIG. 5A, a0 shows an initial state immediately before a drive voltage pulse is applied. When the drive voltage pulse is applied and the heater is heated, a bubble 33 occurs at a1. As the temperature increases toward the maximum temperature, the bubble grows over a time period through a2 and a3, which causes ink to be extruded from the ejection port. At time a5, an interface on the side of the ejection port pulled in and thus the bubble disappears. As a result of the bubble disappearance, the bubble on the heater is replaced with ink. That is, a gas covering the heater is replaced with a liquid and thus the heater is covered with the liquid.

There is a large difference in the thermal conductivity between the gas and the liquid, and thus rapid cooling occurs as a result of the replacement of the gas with the liquid. In FIG. 4, in the nozzle state a, the temperature increases in response to the application of the drive voltage pulse and the temperature decreases after the maximum temperature is reached. In the temperature reduction process, a characteristic point occurs, at a time corresponding to a5 in FIG. 5A, in the change in detection temperate with time, and a sudden temperature reduction occurs.

In FIG. 5B, b0 shows an initial state immediately before a drive voltage pulse is applied. Note that FIG. 5B shows a case where an external-dust ejection failure which is one of ink-presence ejection failures occurs. More specifically, in this external-dust ejection failure, it is assumed that a foreign material 31 such as paper dust adheres to the outside of the nozzle surface and ejection is hindered by the foreign material 31. When the drive voltage pulse is applied and the heater is heated, a bubble 33 occurs at b1. The behavior of the bubble in the nozzle up to this point is similar to that in FIG. 5A. However, in contrast to FIG. 5A, the bubble grows more slowly than in FIG. 5A in a period up to b4, and the bubble disappears more slowly than in FIG. 5A in a period up to b9. In FIG. 4, also in the nozzle state b, the temperature increases in response to the application of the drive voltage pulse and the temperature decreases after the maximum temperature is reached, and in the temperature reduction process, a characteristic point occurs, at a time corresponding to b9 in FIG. 5B, in the change in detection temperate with time, and a sudden temperature reduction occurs. The reason why the bubble grows more slowly than in FIG. 5A is that the growth of the bubble does not cause the ink to be pushed out toward the ejection port where the flow resistance is small if no foreign material exists on the nozzle surface, and thus a reduction in the growth of bubble occurs. The reason why the bubble disappears more slowly than in FIG. 5A is that in the bubble disappearing process, the bubble is not filled back by ink from the side of the ejection port.

In the external-dust ejection failure state, the bubble disappearing time is longer than in the normal ejection state, and the temperature of the heater decreases gradually with passage of time, which causes the difference in temperate between the heater and ink to become small. Therefore, the temperature change which occurs in the external-dust ejection failure state is smaller than that which occurs in the normal ejection state.

The change in the cross section of the nozzle part with time which occurs in the external-dust ejection failure state, which is one of the ink-presence ejection failure states, has been described above with reference to FIG. 5B. Other types of the ink-presence ejection failures may also occur, for example, in the following cases:

a wet ejection failure which occurs when ink adheres to the nozzle surface due to a satellite droplet or mist and ejection is hindered by the adhering ink; a thickened ink ejection failure which occurs when the viscosity of ink is increased (thickened) by moisture evaporation from the ejection port and ejection is hindered by the increased viscosity; and an internal-dust ejection failure which occurs when a foreign material intrudes into the inside of the nozzle and the ejection is hindered by the foreign material. Also in these types of ink-presence ejection failure states, a characteristic point appears later than in the case of the normal ejection state. However, there is a slight difference in the degree of delay of the advent of the characteristic point depending on the type and degree of the ejection failure.

This is because the flow resistance on the ejection port side and the flow resistance on the ink supply flow path side in the nozzle part vary depending on the type and degree of ejection failure, and thus a difference occurs in the process of the growth and the disappearance.

In FIG. 5C, c0 shows an initial state immediately before a drive voltage pulse is applied. Note that FIG. 5C shows a case where an air bubble ejection failure which is one of ink-presence ejection failures occurs. More specifically, in this air bubble ejection failure, it is assumed that an air bubble 32 intrudes into the inside of the nozzle and the ejection is hindered by the air bubble 32. When a drive voltage pulse is applied, the heater is heated, but a bubble is not generated at c1 and in the following period because there is no ink on the heater. Therefore, bubble disappearance does not occur and thus the replacement from gas to liquid does not occur on the heater surface, and therefore the temperature decreases simply and gradually. Thus, no characteristic point appears.

In this specific example, the nozzle has a nozzle height h1=26 μm and a flow path height h2=20 μm. Under the conditions in the present embodiment, the characteristic point appears 5 μsec after the drive voltage is applied in the case of the normal ejection state, and the characteristic point appears 9 μsec after the drive voltage is applied in the case of the external-dust ejection failure state which is one of the ink-presence ejection failure states. In these cases, the characteristic points are based on the bubble disappearance time. The time at which the characteristic point occurs in the normal ejection state is determined by various factors including the driving conditions such as the drive voltage pulse condition, the nozzle dimensions such as the ejection port shape, the nozzle height, and the like, the physical ink properties such as the viscosity and temperature of the ink, and the like. On the other hand, in the ink-presence ejection failure state, the characteristic point occurs always later than in the normal ejection state because the flow resistance in the nozzle part is higher than that in the normal ejection. The fact that the characteristic point occurs in both the normal ejection state and the ink-presence ejection failure state, and the fact that the characteristic point in the ink-presence ejection failure state occurs later than in the normal ejection state always hold regardless of the details of the conditions. Therefore, it is always possible to determine the normal ejection and the ink-presence ejection failure.

Figure 6:
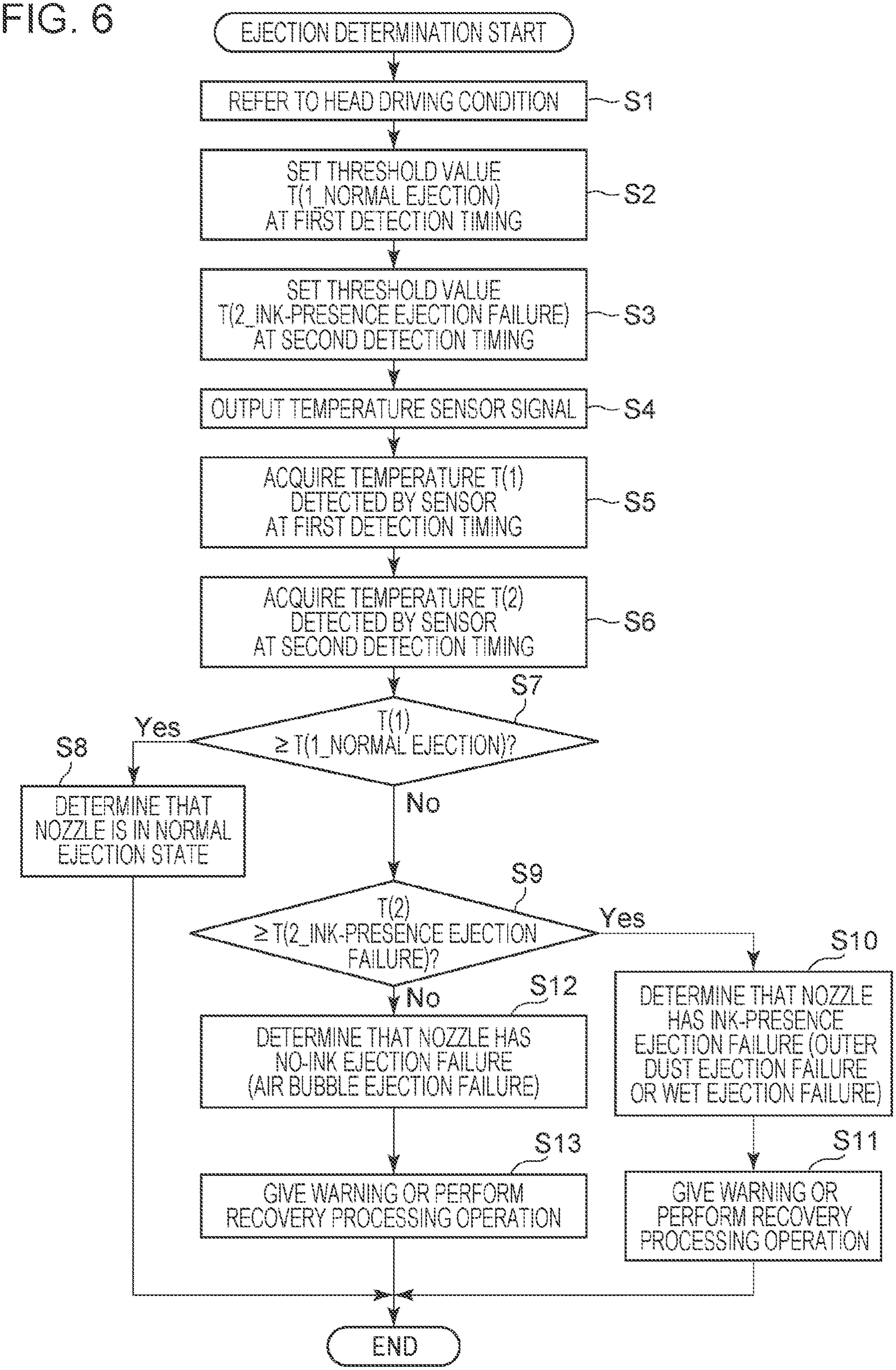
FIG. 6 is a flowchart showing an ejection failure determination process.

FIG. 6 is a flowchart showing a nozzle ejection failure determination process according to the present embodiment. Referring to FIGS. 4 and 6, the flow of the ejection failure determination process according to the present embodiment is described below.

First, in step S1, a head drive condition applied to the heater 3 is referred to, and a first detection timing 34 and a second detection timing 35 are set in advance such that the first detection timing 34 occurs between a characteristic point in the normal ejection state and a characteristic point in the ink-presence ejection failure state, and the second detection timing 35 occurs after the characteristic point in the ink-presence ejection failure state.

Since a temperature difference occurs depending on whether a characteristic point occurs or not, it is possible to set temperature threshold values in advance. In step S2, a threshold value at the first detection timing 34 is set to T(1_normal ejection). In step S3, a threshold value at the second detection timing 35 is set to T(2_ink-presence ejection failure). The threshold values may be set to predicted values in advance before shipment, or may be set based on the normal ejection state and the ink-presence ejection failure state experimentally generated by changing the conditions of the drive voltage pulse.

Then, in step S4, the temperature is output from the temperature sensor at the first and second detection timings as the drive control is performed. Then, in step S5, the temperature T(1) at the first detection timing (the first timing) 34 is acquired, and in step S6, the temperature T(2) at the second detection timing (the second timing) 35 is acquired.

In step S7, the detected temperature acquired in steps S4 are compared with the threshold value set in step S2, and in step S9, the detected temperature acquired in step S5 are compared with the threshold value set in step S3. In a case where it is determined in step S7 that T(1)≥T(1_normal ejection), the process proceeds to step S8 in which it is determined that the nozzle is in the normal ejection state. On the other hand, in a case where it is determined in step S7 that T(1)<T(1_normal ejection), the process proceeds to step S9. That is, at the first timing 34, it can be determined whether a liquid is ejected from the ejection port normally or abnormally. In a case where it is determined in step S9 that T(2)≥T(2_ink-presence ejection failure), the process proceeds to step S10 in which it is determined that the nozzle is in the ink-presence ejection failure state. In this case, the process further proceeds to step S11 in which a warning is displayed or a recovery operation is performed. In a case where it is determined in step S9 that T(2)<T(2_ink-presence ejection failure), the process proceeds to step S12 in which it is determined that the nozzle is in the no-ink ejection failure state. In this case, the process further proceeds to step S13 in which a warning is displayed or a recovery operation is performed. That is, when it is determined at the first timing 34 that the liquid ejection from the ejection port is abnormal, it is possible to determine, at the second timing 35, the type (the cause) of the abnormality. In the present embodiment, in steps S7 and S9, the detected temperature detected at the first and second detection timings are each compared with the corresponding one threshold value. This is important because each threshold value can be set within a large range, and thus it becomes possible to achieve more reliable determination result. That is, this makes it possible to enhance the robustness against the manufacturing variation of the nozzle size and the variation of the ink physical properties due to the change with time.

According to the first embodiment described above, a determination is made twice as to whether a temperature reduction related to a characteristic point occurs such that the determination is made once at one of the two detection timings based on the normal ejection state, and the determination is made once at the other one of the two detection timings based on the ink-presence ejection failure state. This makes it possible to determine whether the ejection failure is of the ink-presence ejection failure type or the no-ink ejection failure type.

In other words, the state of liquid ejection from the ejection port can be determined.

Second Embodiment

In the first embodiment described above, the state of the ejection failure is determined from the detections at the two detection timings based on characteristic points in the change in the sensor temperature with time. In a second embodiment described below, using the fact that a sudden temperature reduction occurs at a characteristic point, the detected temperate is first-order differentiated over the entire range of the temperature reduction process thereby emphasizing the temperature change at the characteristic point. Variations of ink and nozzles are often occur as high-frequency noise, and thus the influence of such variations on the result of the emphasizing process can be reduced by using a filter circuit. Therefore, from the viewpoint of detecting whether there is a characteristic point, the second embodiment provides a better method than the above-described first embodiment based on a change in temperate. In the present embodiment, the first-order differentiation is used in the emphasizing process, but second-order differentiation, frequency analysis, or other methods may be used to achieve the emphasizing process.

Figure 7:
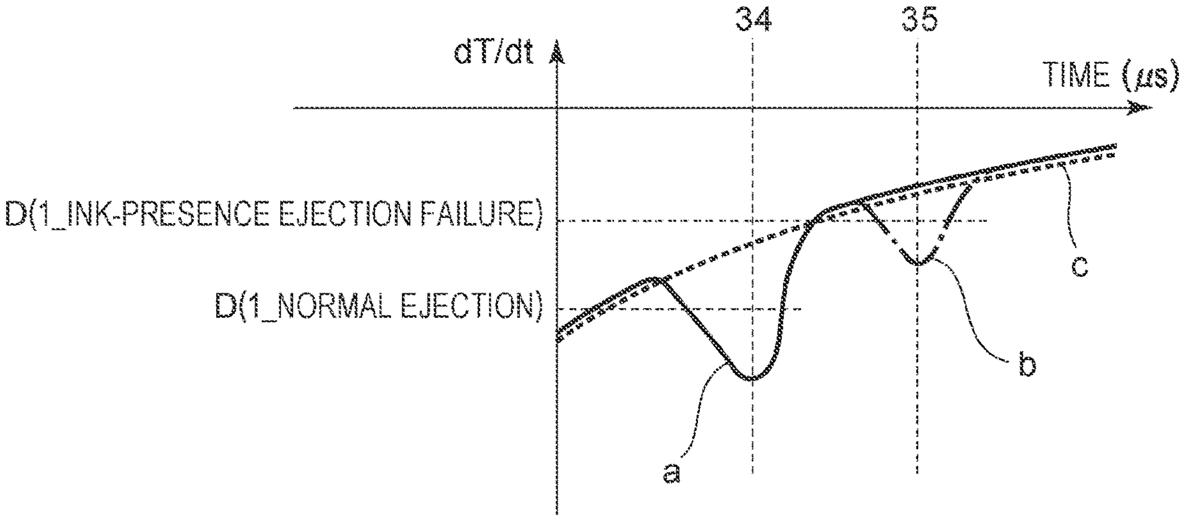
FIG. 7 is a diagram showing a change in detected temperature with time according to one or more aspects of the present disclosure.

FIG. 7 shows a graph indicting a result obtained when the temperature change detected by the temperature sensor is first-order differentiated over the entire range of the temperature reduction process for the respective states a, b, and c described above with reference to FIG. 4. In a case where there is a characteristic point, performing the first-order differentiation results in an occurrence of a peak on the graph. Also in this case, as can be seen from FIG. 7, characteristic points occur in the states a and b at different times depending on the state is a or b, but no characteristic point occurs for the state c.

Figure 8:
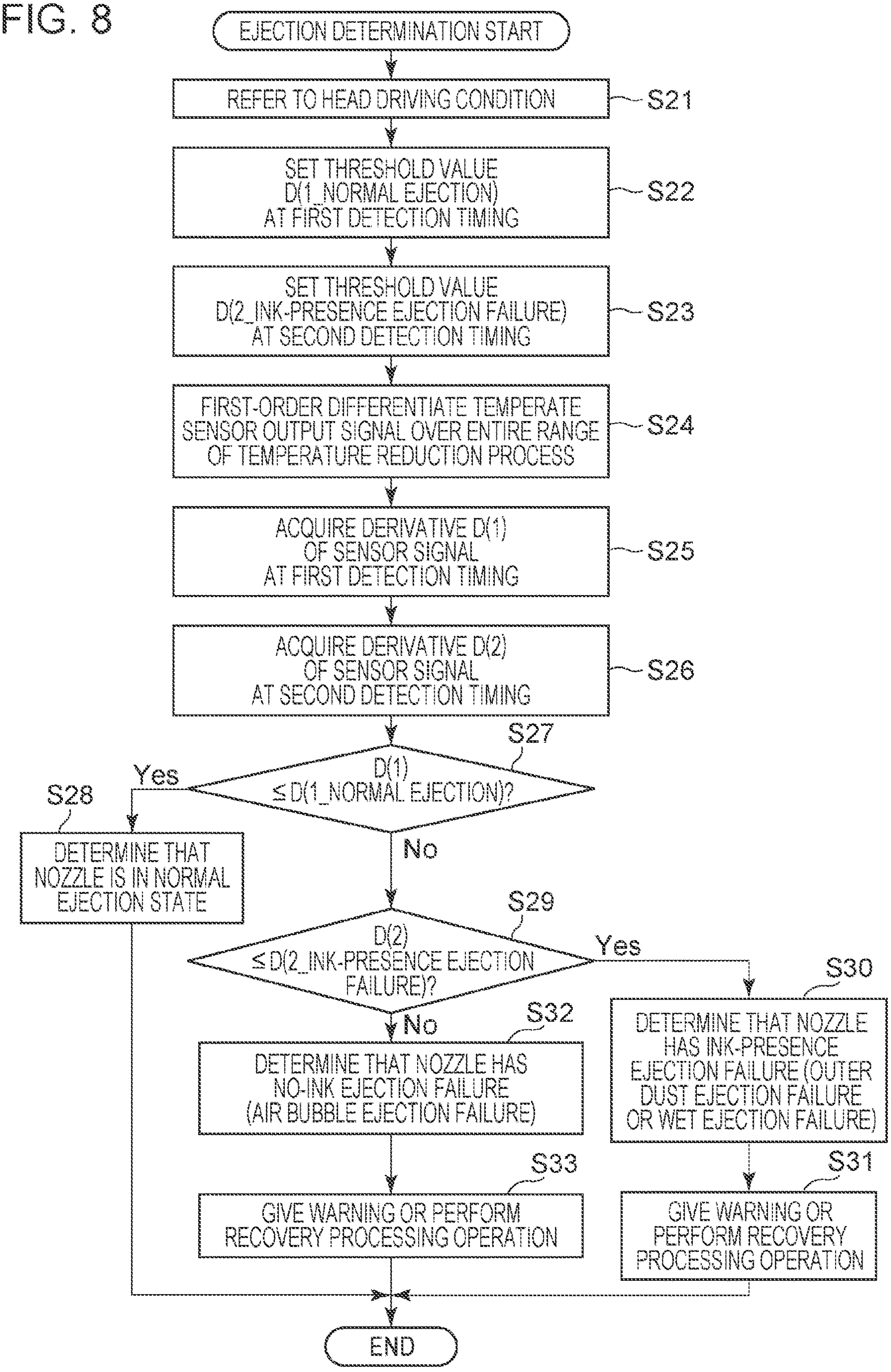
FIG. 8 is a flowchart showing an ejection failure determination process according to one or more aspects of the present disclosure the second embodiment.

FIG. 8 is a flowchart showing a nozzle ejection failure determination process according to the present embodiment. Referring to FIGS. 7 and 8, the flow of the ejection failure determination process according to the present embodiment is described below.

First, in step S21, a head drive condition applied to the heater 3 is referred to, and a first detection timing 34 and a second detection timing 35 are set in advance such that the first detection timing 34 is located near a peak based on a characteristic point in the normal ejection state, and the second detection timing 35 is located near a peak based on a characteristic point in the ink-presence ejection failure state.

Depending on whether there is a characteristic point or not, a peak occurs and the value thereof changes, and thus it is possible to set a threshold value in advance.

In step S22, a threshold value at the first detection timing 34 is set to D(1_normal ejection). In step S23, a threshold value at the second detection timing 35 is set to D(2_ink-presence ejection failure). Also in this case, the threshold values may be set to predicted values in advance before shipment, or may be set based on the normal ejection state and the ink-presence ejection failure state experimentally generated by changing the conditions of the drive voltage pulse.

Then, in step S24, the temperature sensed by the temperature sensor is first-order differentiated at the first and second detection timings as the drive control is performed, and the resultant derivatives are output. In step S25, the derivative D(1) at the first detection timing 34 is acquired, and in step S26, the derivative D(2) at the second detection timing 35 is acquired.

In step S27, the derivative acquired in steps S24 is compared with the threshold value set in step S22, and in step S29, the derivative acquired in step S25 is compared with the threshold value set in step S23. In a case where it is determined in step S27 that D(1)≤D(1_normal ejection), the process proceeds to step S28 in which it is determined that the nozzle is in the normal ejection state. On the other hand, in a case where it is determined in step S27 that D(1)>T(1_normal ejection), the process proceeds to step S29. In a case where it is determined in step S29 that D(2)≤D(2_ink-presence ejection failure), the process proceeds to step S30 in which it is determined that the nozzle is in the ink-presence ejection failure state. In this case, the process further proceeds to step S31 in which a warning is displayed or a recovery operation is performed. In a case where it is determined in step S29 that D(2)>D(2_ink-presence ejection failure), the process proceeds to step S32 in which it is determined that the nozzle is in the no-ink ejection failure state. In this case, the process further proceeds to step S33 in which a warning is displayed or a recovery operation is performed.

Although the first-order derivative makes it possible to indicate a characteristic point by a peak, when a slight shift between the detection timing and the peak occurs due to a variation in ink or the nozzle, the slight shift can cause a significant influence on the values. To handle the above situation, instead of setting the detection timing near the peak, it may be better to set a detection range with a time width around the peak and output a minimum value thereof. Especially when an analog circuit is used, this method is very suitable because it is easy for the analog circuit to provide an output in such a manner.

In the second embodiment, as described above, a determination is made twice as to whether a peak related to a characteristic point occurs in the first-order derivative in the temperature reduction process such that the determination is made once at a detection timing based on the normal ejection state, and the determination is made once at a detection timing based on the ink-presence ejection failure state. This makes it possible to determine whether the ejection failure type is the ink-presence ejection failure or the no-ink ejection failure. Thus, it is possible to display an optimum warning and/or perform an optimum recovery operation depending on the type of the ejection failure. In this second embodiment as in the first embodiment, in each of comparison steps S27 and S29 at the first and second detection timings, the comparison is made with one threshold value. This is important because each threshold value can be set within a large range, and thus it becomes possible to achieve more reliable determination result. That is, this makes it possible to enhance the robustness against the manufacturing variation of the nozzle size and the variation of the ink physical properties due to the change with time.

Application to Supplying Ink from One Side

In the examples described above, ink is supplied to the nozzle from both sides. Assuming this nozzle structure, the ejection failure state is determined based on the fact that a characteristic point occurs due to bubble disappearance in the normal ejection state and the ink-present ejection failure state, and the fact that the characteristic point occurs in the ink-presence ejection failure statue later than in the normal ejection state. This feature also occurs in the case where the nozzle is configured such that ink is supplied from one side, and thus it is possible to perform a determination process in a similar manner to the case where ink is supplied from both sides.

In the above description according to the present embodiment, it has been assumed that the bubble generated in the nozzle disappears without communicating with the atmosphere. However, depending on the nozzle dimensions, the generated bubble may communicate with the atmosphere. In this case, the bubble may behave as follows. The bubble pressure with a negative pressure tries to become equal to the atmospheric pressure, but a tail part of an ejected droplet is torn off by the negative pressure of the bubble and crashes down to the heater surface (hereinafter, this will be referred to as a tail tear-off crash). Such a nozzle may have dimensions of, for example, h1=22 μm and h2=16 μm. As a result of the tail tear-off crash, the bubble on the heater surface is replaced with ink, that is, gas covering the heater surface is replaced with a liquid and thus quick cooling occurs, which causes a characteristic point to occur. Also in such a nozzle, in the normal ejection state, re-contacting of ink with the heater surface causes quick cooling. Therefore, also in this type of nozzle, as with the nozzle that does not communicate with the atmosphere according to the first or second embodiment, a characteristic point occurs in the ink-presence ejection failure state later than in the normal ejection state. That is, the temperature changes with time in a similar manner to that in the previous embodiments, and it is possible to detect an ejection failure by performing a determination process in a similar manner.

Figure 9:
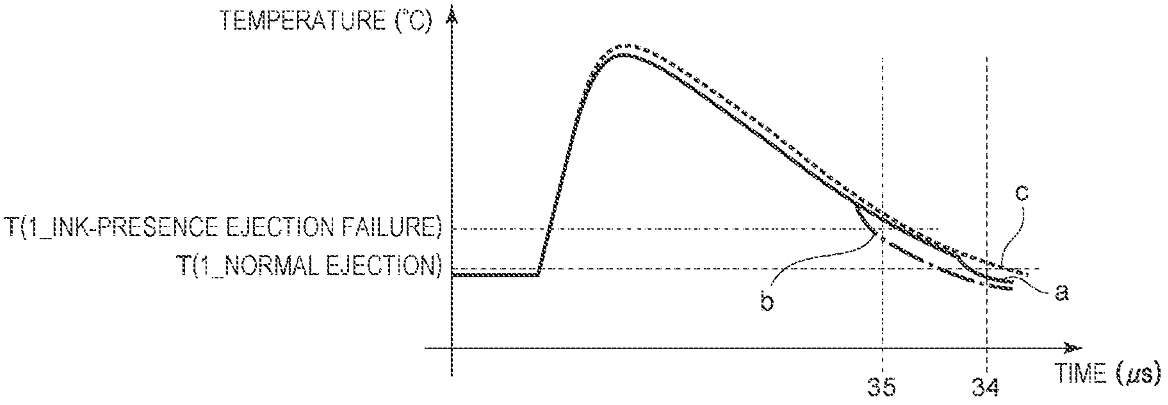
FIG. 9 is a diagram showing, in the second embodiment of the present disclosure, a time-dependent change in temperature detected by a sensor which occurs when a heater is driven, in a case where a nozzle is configured to have nozzle dimensions which allow it eject all ink existing on the heater in a normal ejection state, wherein the time-dependent change in temperature is shown for each of three ejection states.
Figure 10:
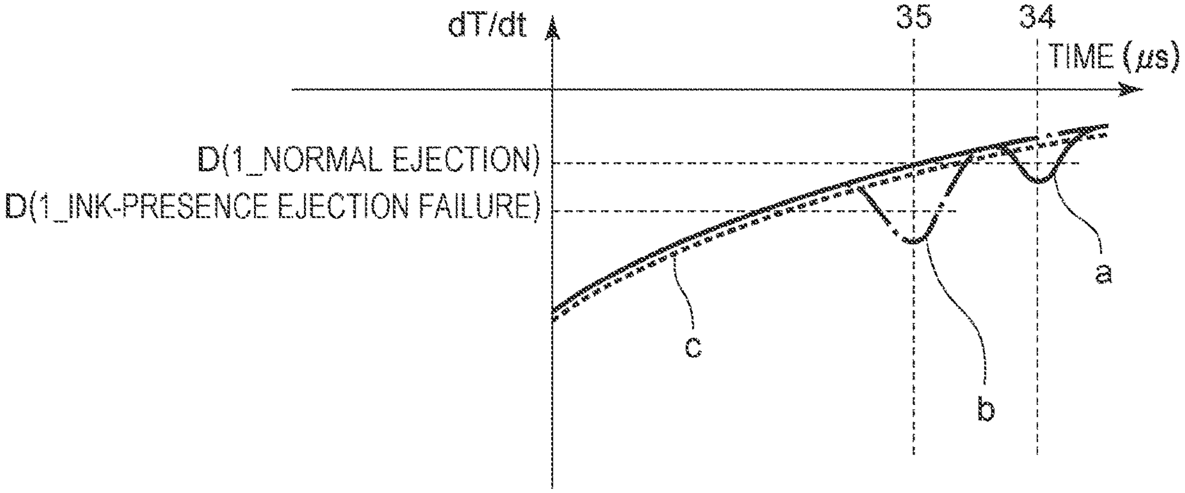
FIG. 10 is a diagram showing, in the second embodiment of the present disclosure, a first-order derivative of a time-dependent change in temperature detected by a sensor which occurs when a heater is driven, in a case where a nozzle is configured to have nozzle dimensions which allow it eject all ink existing on the heater in a normal ejection state, wherein the first-order derivative is plotted over a range of a temperature reduction process for each of three ejection states.
Figure 11A:
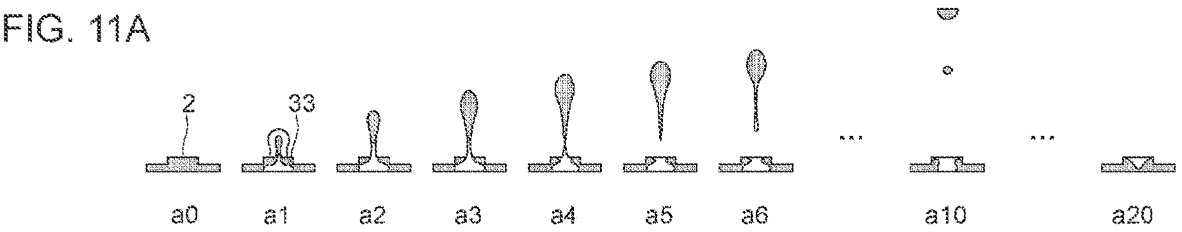
FIGS. 11A, 11B, and 11C illustrate time-dependent changes in a cross section of a nozzle part which occur when a heater is driven in the respective ejection states shown in FIGS. 9 and 10.
Figure 11B:
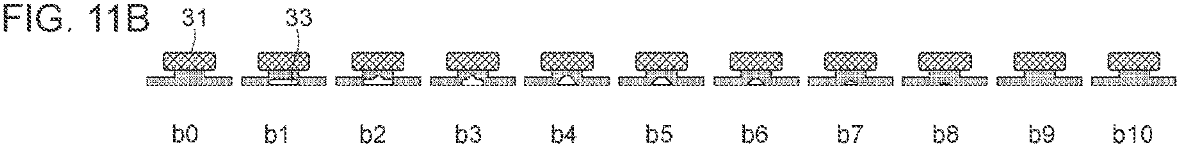
Figure 11C:
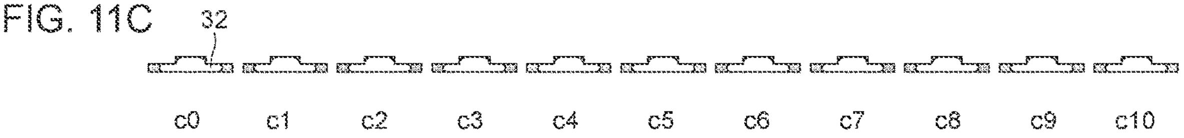

There is a possibility that depending on the nozzle dimensions, after the bubble gets to communicate with the atmosphere, all ink on the heater surface is ejected without tail tear-off crash onto the heater surface. Such a nozzle may have dimensions of, for example, h1=9.5 μm and h2=5.0 μm. Such a nozzle may have temperature changes with time as shown in FIG. 9. In this case, the first-order derivatives obtained for these temperate changes with time are shown in FIG. 10. FIG. 11 illustrate changes in the cross-section of the nozzle part for each state. In such a nozzle, since bubble disappearance and tail tear-off crash do not occur, there is still no ink on the heater surface even at a10 in the normal ejection state. When ink is refilled, the bubble on the heater surface is replaced with ink at a20. As a result of the refilling, the bubble on the heater surface is replaced with ink, that is, gas covering the heater surface is replaced with a liquid and thus quick cooling occurs, which causes a characteristic point to occur. On the other hand, in the ink-presence ejection failure state, the bubble disappears at b7, and a characteristic point occurs. Therefore, by setting first detection timing based on the characteristic point caused by the refilling of ink in the normal ejection state and second detection timing based on the characteristic point in the ink-presence ejection failure state, it is possible to perform the determination. Note that in the ink-presence ejection failure state, the characteristic point occurs earlier than in the normal ejection state. That is, the second detection timing occurs later than the first detection timing, which is opposite to the occurrence order in the previous examples. Therefore, the steps S7 and S9 for the determination may be reversed in order.

Second Detection Timing

In the present embodiment, based on the fact that in the ink-presence ejection failure state, the characteristic point occurs earlier than in the normal ejection state, the first and second detection timings corresponding to the respective characteristic points are set fixedly. In the normal ejection state, the characteristic point occurs at the fixed point of time when the ink and nozzle conditions are the same. On the other hand, in the ink-presence ejection failure state, the characteristic point occurs at different points of time depending on the details of the ejection failure, or, even for the same type of ejection failure, depending on the degree of the ejection failure.

Examples of types of ejection failures in the ink-presence ejection failure state include the external-dust ejection failure, the wet ejection failure, the thickened ink ejection failure, and the internal-dust ejection failure. The flow resistance of the nozzle part on the ejection port side and the flow resistance of the ink supply flow path side are different depending on the types of ejection failures, and thus the characteristic point occurs at different timings depending on the types of ejection failures. The higher the flow resistance depending on the type of the ejection failure, the later the timing of the characteristic point. Therefore, by appropriately setting the detection timing, it is possible to detect the type of the ejection failure in the ink-presence ejection failure state.

Figure 12:
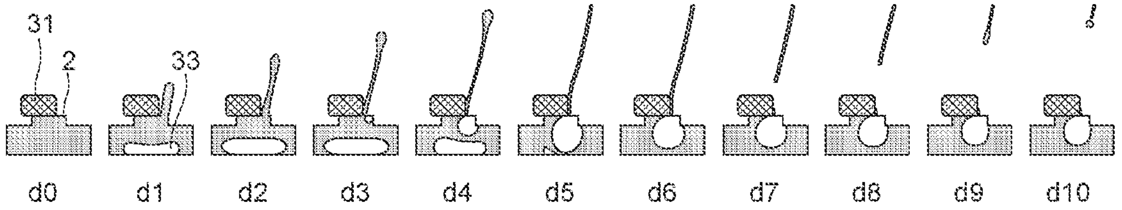
FIG. 12 is a diagram illustrating a change in cross section of a nozzle part with time which occurs when a heater is driven in a state similar to that shown in FIG. 5B but a foreign material partially blocks the ejection port.

In the external-dust ejection failure state, for example, the degree of ejection failure may be such that, as shown in FIG. 12, the external dust does not completely block the ejection port but the external dust partially blocks the ejection port. In this case, bubble disappearing corresponding to a characteristic point occurs at d6 which is located between the bubble disappearing at a5 in the normal ejection state and the bubble disappearing at c9 in the external-dust ejection failure state shown respectively in FIGS. 5A and 5B. As described above, the characteristic point occurrence timing is more delayed as the flow resistance increases depending on the degree of ejection failure, and thus, by appropriately setting the detection timing, it is possible to detect the degree of the ejection failure in the ink-presence ejection failure state.

As can be seen from the above discussion, the essence of the present disclosure is in that the first detection timing is set in advance based on the characteristic point occurring in the normal ejection state depending on the nozzle, and the second detection timing is set based on the characteristic point depending on the state of the ejection failure. That is, the second detection timing is provided not necessarily to determine whether or not the nozzle has the ink-presence ejection failure, but to determine the type of ejection failure that is to be surely detected and the degree of the ejection failure.

According to the embodiment described above, it is possible to determine whether or not the nozzle has an ejection failure, and determine the type of the ejection failure such as the ink-presence ejection failure or the no-ink ejection failure. The determination is performed at two timings based on the characteristic points corresponding to the normal ejection state and the ink-presence ejection failure state such that the determination process is performed twice wherein the comparison with one threshold value is performed in each determination process. Since the determination process is performed only twice, the determination can be made at a high speed. In addition, since the comparison is performed with only one threshold value in each determination process, it is allowed to set the comparison range large, which make it possible to achieve high reliability in the determination. Furthermore, depending on the position where the second detection timing is set, it is possible to more finely determine the state of the ejection failure and the degree of the ejection failure.

When the determination result indicates the occurrence of the no-ink ejection failure, the air bubble ejection failure is assumed and the recovery operation is performed such that the nozzle surface is wiped while performing sucking. A specific example of such a recovery operation is vacuum wiping. In the case of the ink-presence ejection failure, the wet ejection failure or the external-dust ejection failure is assumed, and the recovery operation is performed such that the nozzle surface is wiped without performing sucking. A specific example of such a recovery operation is blade wiping.

One example of the ink-presence ejection failure is a thickened ink ejection failure which occurs when the viscosity of ink increases owing to moisture evaporation from an ejection port and the ejection is hindered by the increased viscosity. Another example is an internal-dust ejection failure which occurs when a foreign material intrudes into the inside of the nozzle and the ejection is hindered by the foreign material. When such an ejection failure occurs, it may be necessary to perform a recovery operation such that the nozzle surface is wiped while performing sucking as with the recovery operation for the no-ink ejection failure. However, in a case where a nozzle has a capability of recirculation using a differential pressure or the like, the increase in ink viscosity does not occur, and thus the ejection failure is not cased by the increase in ink viscosity. In most cases, the internal-dust ejection failure is caused by a foreign material which intrudes during a manufacturing process, and it is often difficult to remove such a foreign material by the recovery operation. In such a case, it may be sufficient only to identify whether the ejection failure is of the ink-presence ejection failure type or the no-ink ejection failure type at a high speed with high accuracy. In such a case, in accordance with the result of the determination as to whether the ejection failure is of the ink-presence ejection failure type or the no-ink ejection failure type, an optimum recovery operation may be performed thereby making it possible to reduce the downtime and the amount of waste ink. Therefore, depending on the position where the second detection timing is set, as required, it is possible to more finely determine the ejection failure state and the degree of the ejection failure.

According to the present disclosure, it is possible to determine whether or not ink is normally ejected and it is possible to determine the state of an ejection failure by performing the determination process twice using a comparison with one threshold value in each determination process. This makes it possible to increase the detection speed and enhance the detection reliability. Thus, it is possible to determine the state of the ejection failure, and more specifically, it is possible to determine whether the ejection failure occurs in the state where there is ink on the heater as typified in the case of the external-dust ejection failure or the wet ejection failure, or whether the ejection failure occurs in the state in which there is no ink on the heater as typified in the case of the air bubble ejection failure. According to the determined state of the ejection failure, it is possible to perform an appropriate process such as the recovery operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-135582 filed Aug. 23, 2021, which is hereby incorporated by reference herein in its entirety.

What is claimed is:

1. A method of determining, in a liquid ejection apparatus, a state of a liquid ejection from an ejection port,
 the liquid ejection apparatus comprising
 the ejection port configured to eject a liquid,
 a substrate comprising an electrothermal conversion element configured to generate heat for ejecting the liquid from the ejection port, and
 a temperature detection unit configured to detect temperature information on the substrate,
 the method comprising:
 performing a first comparison process to compare the temperature information on the substrate detected at a first timing by the temperature detection unit with a first threshold value,
 wherein at the first timing, a normal ejection state is determined of the liquid ejected from the ejection port when the detected temperature is above the first threshold value,
 wherein at the first timing, an abnormal ejection state is determined of the liquid ejected from the ejection port when the detected temperature is below the first threshold value; and
 performing a second comparison process to compare the temperature information on the substrate detected at a second timing by the temperature detection unit with a second threshold value,
 wherein at the second timing, in a case where the liquid is ejected from the ejection port in the abnormal state, a type of abnormality is determined as an ink-presence ejection failure state or a no-ink ejection failure state.

2. The method of determining according to claim 1, wherein the temperature information is information on a temperature of the substrate.

3. The method of determining according to claim 1, wherein the temperature information is information on a first-order derivative of a waveform of a temperature change of the substrate.

4. The method of determining according to claim 1, wherein the temperature information is information on a second-order derivative of a waveform of a temperature change of the substrate.

5. The method of determining according to claim 1, wherein at the second timing, it is determined whether the abnormality of ejection of the liquid from the ejection port occurs in a state in which there is a liquid on the electrothermal conversion element, or the abnormality of ejection of the liquid from the ejection port occurs in a state in which there is no liquid on the electrothermal conversion element.

6. The method of determining according to claim 1, wherein
 the first timing is based on a timing at which, in a normal state of the liquid ejection from the ejection port, the liquid comes into contact with the electrothermal conversion element after the electrothermal conversion element is driven, and
 the second timing is based on a timing at which, in an abnormal state of the liquid ejection from the ejection port, the liquid comes into contact with the electrothermal conversion element after the electrothermal conversion element is driven.

7. The method of determining according to claim 1, wherein in a state where the liquid is ejected normally from the ejection port, in a case where a bubble generated by the electrothermal conversion element does not get to communicate with an atmosphere, or in a case where the bubble gets to communicate with the atmosphere and a tail part of a droplet ejected from the ejection port crashes to the electrothermal conversion element, the first timing is earlier than the second timing.

8. The method of determining according to claim 1, wherein in a state where the liquid is ejected normally from the ejection port, in a case where a bubble generated by the electrothermal conversion element gets to communicate with an atmosphere and a tail part of a droplet ejected from the ejection port does not crash to the electrothermal conversion element, the first timing is later than the second timing.

9. The method of determining according to claim 1, wherein
 a temperature detection element for detecting a temperature of the substrate is formed directly below or directly above the electrothermal conversion element, and
 the temperature detection unit detects the temperature information on the substrate based on a result output by the temperature detection element.

10. The method of determining according to claim 1, wherein in a case where it is determined at the first timing that ejection of the liquid from the ejection port is abnormal, a recovery operation on the ejection port is performed.

11. A liquid ejection apparatus comprising:

an ejection port configured to eject a liquid;

a substrate comprising an electrothermal conversion element configured to generate heat for ejecting the liquid from the ejection port; and a temperature detection unit configured to detect temperature information on the substrate, wherein the temperature information on the substrate detected at a first timing by the temperature detection unit is compared with a first threshold value, wherein at the first timing, a normal ejection state is determined of the liquid ejected from the ejection port when the detected temperature is above the first threshold value, wherein at the first timing, an abnormal ejection state is determined of the liquid ejected from the ejection port when the detected temperature is below the first threshold value, and wherein the temperature information on the substrate detected at a second timing by the temperature detection unit is compared with a second threshold value, wherein at the second timing, in a case where the liquid is ejected from the ejection port in the abnormal state, a type of abnormality is determined as an ink-presence ejection failure state or a no-ink ejection failure state.

* * * * *